Jan. 31, 1939.　　　J. I. KUSHIMA ET AL　　　2,145,516
DASH CONTROL GEAR SHIFT
Filed Dec. 23, 1937　　　2 Sheets-Sheet 1
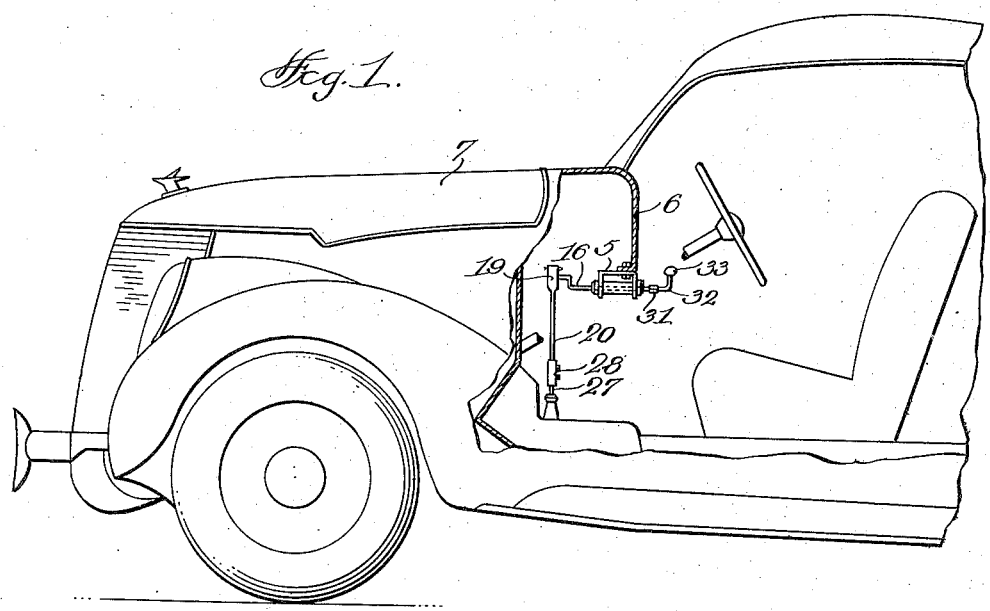
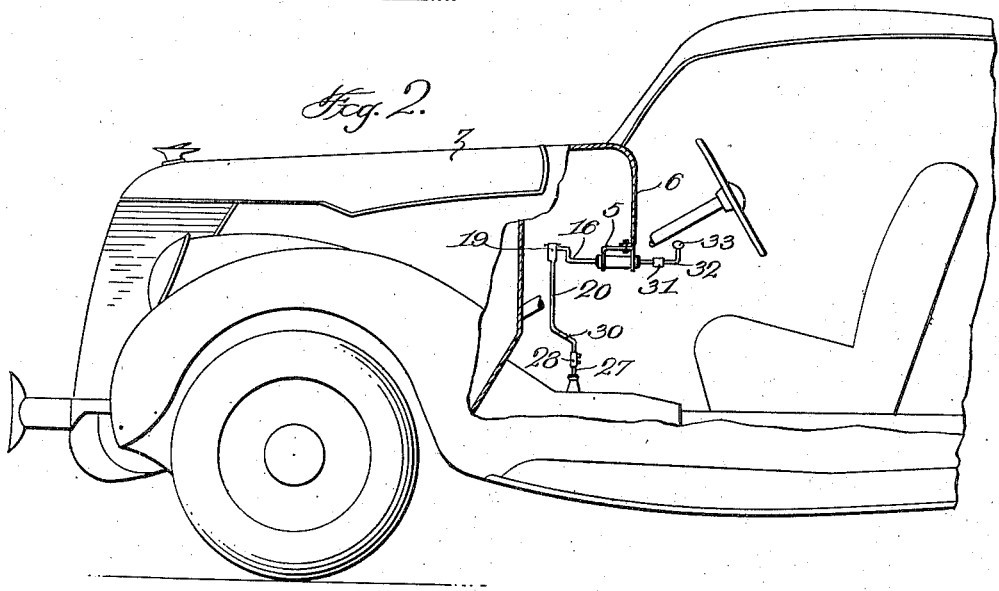
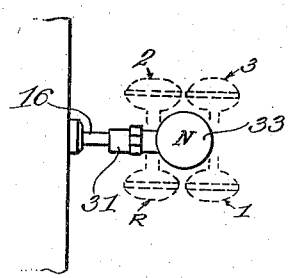
Inventors
James I. Kushima &
Ronald K. Agena
By Ralph Burch
Attorney Jan. 31, 1939.  J. I. KUSHIMA ET AL  2,145,516
DASH CONTROL GEAR SHIFT
Filed Dec. 23, 1937  2 Sheets-Sheet 2
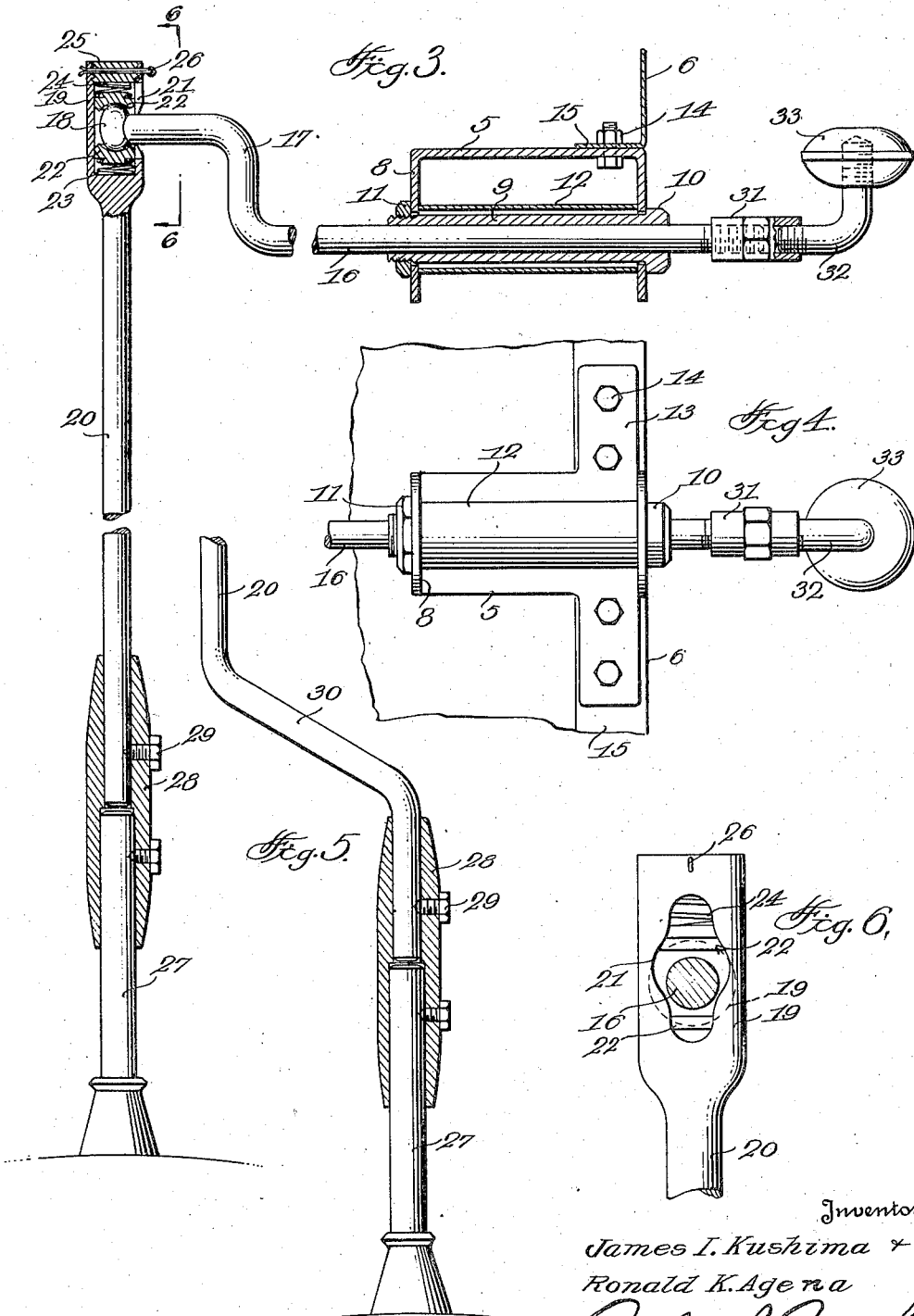
Inventors
James I. Kushima &
Ronald K. Agena
By Ralph Burch
Attorney Patented Jan. 31, 1939

2,145,516

UNITED STATES PATENT OFFICE 2,145,516

DASH CONTROL GEAR SHIFT

James I. Kushima and Ronald K. Agena, Ewa, Territory of Hawaii

Application December 23, 1937, Serial No. 181,404

1 Claim. (Cl. 74—473)

This invention relates to gear shifting levers for automobile transmissions and more particularly to mechanism for operating the gear shift lever from the dashboard of an automobile.

It is an object of the invention to provide a control lever mounted on the dashboard of a motor vehicle and operatively connected with the gear shifting lever of the transmission, thereby eliminating the usual shifting lever and thus increasing the leg space for the driver and permitting free movement of the front seat passengers towards either of the front doors.

A further object of the invention resides in providing mechanism of the above-mentioned character which is simple and durable in construction, reliable and efficient in operation and inexpensive to manufacture.

Other objects and advantages of the invention will be apparent during the course of the following description.

In the accompanying drawings, forming a part of this specification and in which like numerals are employed to designate like parts throughout the same, Fig. 1 is a side elevation of one form of control mechanism applied to the dashboard of an automobile, Fig. 2 is a similar view showing a slightly modified form of control mechanism, Fig. 3 is an enlarged side elevation of the control mechanism showing parts of the mechanism in section, Fig. 4 is a bottom view of the bracket for supporting the control lever, Fig. 5 is a detail view of the modified form of extension rod between the control lever and gear shift lever, Fig. 6 is a section taken on lines 6—6 of Fig. 3, and, Fig. 7 is a detail plan view of the hand lever showing in dotted lines the relative positions of the handle for shifting the gears.

In the drawings, wherein for the purpose of illustration, a preferred embodiment of the invention has been shown, the numeral 5 denotes a bracket adapted to be attached to the lower edge of the dashboard 6 of a motor vehicle 7. The bracket is formed from a plate bent U-shape to provide spaced parallel depending arms 8 having alined openings to receive a fibre bushing 9. The bushing has a head 10 at one end and is secured in place by a nut 11 threaded on the opposite end thereof. A metal sleeve 12 surrounds the bushing, intermediate the arms 8 and serves to reinforce the arms. The bracket 5 has laterally extending tabs 13 provided with apertures to receive bolts 14 for securing the bracket to the flange 15 of the dashboard 6. A control lever 16 extends through the bushing 9 and is capable of slidable and rotatable movement therein, the inner end of the lever being bent to form a crank 17 having a ball head 18 at its free end. The ball head 18 fits in the socket 19 formed integral with the upper end of an extension rod 20, the free end of the crank passing through a longitudinal slot 21 formed in the wall of the socket. The ball head is disposed between friction cups 22 held in contact with the head by coil springs 23 and 24. The spring 24 is retained in the socket by a threaded plug 25 secured in the upper end of the socket and a cotter pin 26 passes transversely through the plug and socket for locking the plug in its adjusted position. The lower end of the extension rod is connected to the gear shift lever 27 by a sleeve 28 secured to the rod and lever by set screws 29. The bore in the lower end of the sleeve is relatively larger than the bore in the upper end to accommodate gear shift levers of varying sizes. In some types of gear shifting transmissions, the lower end of the extension rod 20 must be offset, as shown in Figs. 2 and 5, at 30, to make connection with the gear shift lever 27. The outer end of the control lever 16 is connected by a nipple 31 to an L-shaped hand lever 32 having a knob 33 attached to its free end. By using nipples of varying lengths the hand lever 32 may be positioned the desired distance from the dashboard to suit the convenience of the driver.

In operation, the dash control lever may be readily installed in the conventional motor vehicle. The bracket 5 is attached to the flange 15 of the dashboard 6 by the bolts 14 and the lower end of the extension rod 20 is connected to the gear shift lever 27 of the transmission by the sleeve 28. To shift the gears the driver grasps the knob 33 of the hand lever 32 and by moving the control lever 16 backward or forward and to the right or left, the extension rod 20 is caused to move the gear shift lever 27 to the different positions for changing the gears of the transmission.

It is to be understood that the form of invention herein shown and described is to be taken as a preferred example of the same and that certain changes in the shape, size and arrangement of the parts may be made without departing from the spirit of the invention or the scope of the subjoined claim.

Having thus described our invention, we claim:

In combination with the gear shift lever of an automobile, a bracket for attachment to the dashboard of the automobile including spaced parallel arms having alined apertures, a fibre bushing extending through the arms of said bracket, a control lever slidably and rotatably mounted in said bushing, a crank arm formed integral with one end of said control lever having a head at its free end, a hand lever connected to the opposite end of said control lever, an extension rod fixedly connected to the gear shift lever, a socket formed integral with the upper end of said extension rod adapted to receive the head of said crank arm, friction cups disposed in said socket on opposite sides of said head and springs for holding said cups in engagement with the head.

JAMES I. KUSHIMA.
RONALD K. AGENA.